UNITED STATES PATENT OFFICE.

JULES H. PELLETIER, OF NEW YORK, N. Y.

STOVE-POLISH.

SPECIFICATION forming part of Letters Patent No. 615,042, dated November 29, 1898.

Application filed December 16, 1897. Serial No. 662,222. (No specimens.)

*To all whom it may concern:*

Be it known that I, JULES H. PELLETIER, a subject of the Queen of Great Britain, residing at New York, (Brooklyn,) county of Kings, State of New York, have invented certain new and useful Improvements in Stove-Polishes, fully described and represented in the following specification and the accompanying drawings, forming a part of the same.

My improved stove-polish is composed of turpentine, lampblack, plumbago, a resinous vegetable gum, as spruce or pine gum, coal-tar or other tar, and a green soft soap made of linseed-oil and potash.

The composition may be prepared in the form of a paste or liquid.

When prepared in the form of a paste, the proportions, measured in bulk, are about as follows: Eight parts of plumbago, eight parts of lampblack, two parts of resinous vegetable gum, two parts of coal-tar, and one part of green soft soap, with sufficient turpentine or benzene to mix the same into a stiff paste.

Where it is desired to prepare the stove-polish in the form of a liquid, the proportion of turpentine or benzene is increased rather more than double.

The benzene is very inflammable and is dangerous to use in the preparation of the compound, and I therefore prefer in practice to use the turpentine, although the smell of the latter is rather rank.

To neutralize the smell of the spirits of turpentine, I mix with the composition a very small proportion of mirbane or artificial oil of almonds, which has a strong odor or perfume.

Each of the ingredients in my composition performs a different function, and the composition as a whole serves to blacken and polish heated surfaces, like stoves, with especial efficiency.

Having thus described my composition, what I claim is—

1. The stove-polish herein described, consisting of plumbago, lampblack, vegetable resinous gum, pine-tree tar and green soft soap, the whole mixed with spirits of turpentine in the proportion substantially as herein set forth.

2. The stove-polish herein described, consisting of plumbago, lampblack, vegetable resinous gum, pine-tree tar and green soft soap, spirits of turpentine and a small proportion of mirbane or artificial oil of almonds, to neutralize the odor of the turpentine, the whole combined in the proportions substantially as herein set forth.

In testimony whereof I have hereunto set my hand in the presence of two subscribing witnesses.

JULES H. PELLETIER.

Witnesses:
 THOMAS S. CRANE,
 EDWARD F. KINSEY.